United States Patent [19]
Johnson

[11] 3,737,058
[45] June 5, 1973

[54] LOADING RAMP FOR TRUCKS AND TRAILERS

[76] Inventor: Jerold E. Johnson, Route 1, Box 143, Aitkin, Minn.

[22] Filed: Mar. 9, 1972

[21] Appl. No.: 233,138

[52] U.S. Cl................................214/85, 296/61
[51] Int. Cl................................B65g 67/02
[58] Field of Search....................214/85, 85.1; 296/61; 119/82; 14/72

[56] References Cited

UNITED STATES PATENTS 3,613,920   10/1971   Flamm.................214/85
3,700,124   10/1972   Lawrence.............214/85

Primary Examiner—Albert J. Makay
Attorney—George F. Williamson, Herman H. Bains, Malcolm L. Moore and Conrad A. Hansen

[57] ABSTRACT

A loading ramp for vehicles comprised of a generally U-shaped frame assembly open at its forward end which engages the rear edge of a truck bed and having a pair of hinged ramp panels swingable from an inwardly and downwardly folded position of use to an upright position of non-use wherein the panels and the frame beams to which they are hingedly attached straddle a load on a truck bed on which the ramp is stored.

10 Claims, 4 Drawing Figures

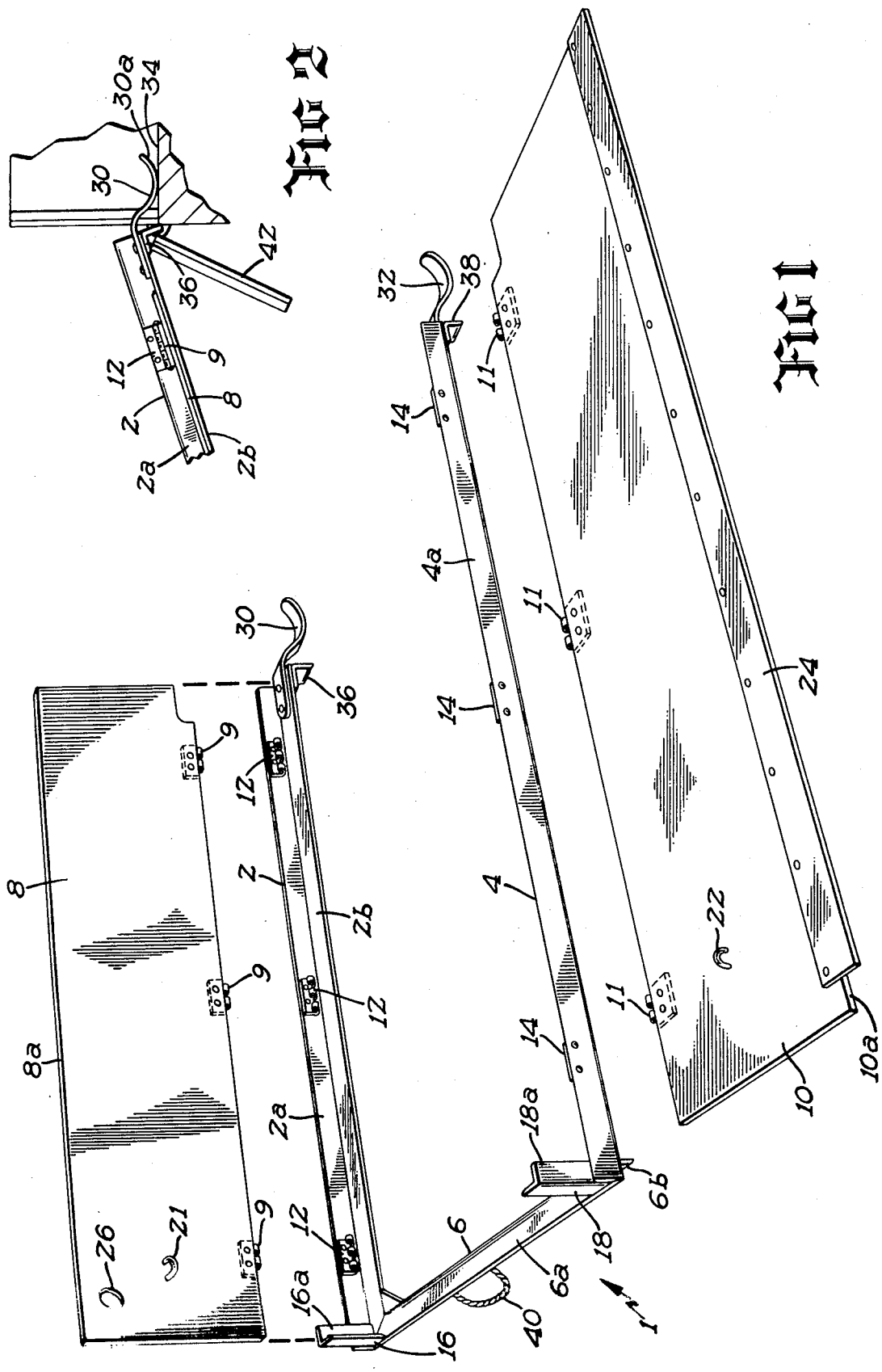

LOADING RAMP FOR TRUCKS AND TRAILERS

BACKGROUND OF THE INVENTION

Ramp devices of various kinds have been devised and used for conveying cargo loads onto and off of the cargo beds of trucks and trailers. A common problem associated with the use of such ramps is the manner of storing the loading ramp on the truck or trailer after a cargo has been loaded onto the cargo bed, without interferring with the cargo. Various means have been devised for providing a collapsible ramp, sometimes with the ramp forming a portion of a truck tail gate assembly, so that the ramp can be collapsed and stored in such a way that it does not interfere with the load being carried on a truck bed. In some instances, special storage spaces have been provided for the loading ramp above or below the cargo. See for example U.S. Pat. Nos. 1,639,897 and 3,352,440 which disclose collapsible loading ramps combined with a truck tail gate.

The limitations of such loading ramps in combination with or forming a part of tail gate assemblies are obvious. Also, in my view, such collapsible loading ramp arrangements are unduly complicated and expensive in comparison with the function and extent of use of the ramp.

Having in mind the foregoing disadvantages and shortcomings associated with existing ramp structures for providing a conveying surface between the rear end of a truck and the ground, I have devised a foldable ramp structure which effectively serves as a loading ramp when fully extended to its inclined position of use in engagement with the rear end of a truck bed, and which can be quickly and easily shifted to a storage position on a truck bed without interfering with the cargo occupying most of the space on the truck bed.

BRIEF SUMMARY OF THE INVENTION

This invention is directed to a loading ramp which can be quickly and easily shifted from a storage position on a truck bed in straddling relation to a load to a rearwardly, inclined position of use wherein it extends between the rear edge of the truck bed and the ground for loading and unloading cargo. Cargo loads of various types may be conveyed on my ramp; however, the ramp has been particularly devised with a view towards loading and unloading vehicles such as snowmobiles onto and from a truck bed, such as that of a pickup truck.

The loading ramp of this invention is particularly characterized by a generally U-shaped frame assembly having a pair of spaced apart, side frame beams to which a pair of ramp panels are hingedly attached for swinging movement from a downwardly disposed position of use wherein they form a continuous conveying surface to an upright position of non-use. After being used to convey a load, such as a snowmobile onto a truck bed, the hinged ramp panels are swung upwardly to a substantially upright position and held in that position by stop means, after which the entire ramp assembly is slidably shifted onto the truck bed with the upright ramp panels and frame side beams straddling the load on the truck bed, the ramp frame assembly being open at its front end so as to permit it to straddle the cargo load without interference.

The foregoing stop means for the hinged ramp panels preferably comprises a pair of upright corner posts located at the rear corners of the frame assembly of the ramp which bear against the rear, outside faces of the hinged ramp panels when the panels are swung to their upright storage position, whereby the corner posts prevent the rear, swinging movement of the ramp panels beyond their desired, upright position of non-use. A spreader bar removably connected between the inside faces of the ramp panels by attachment means thereon, serves to prevent the inward and downward collapse of the panels after they are swung to their upright storage positions.

A particularly beneficial feature of the ramp structure resides in the use of a downwardly depending detent member on the underside of each of the side beams of the ramp frame assembly at the front ends thereof, the detent members being inserted into the space between the rear edge of a truck bed and its downwardly swung tail gate when the ramp is in its inclined position of use, whereby the detent members prevent the longitudinal shifting movement of the ramp when a load is being transported over it.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is an exploded, perspective view of the loading ramp showing the ramp panels and the frame assembly;

FIG. 2 is a fragmentary, side elevation view showing the engagement of the forward end of the ramp with the rear end of a truck bed;

DESCRIPTION OF THE PREFERRED EMBODIMENT

Figure 3:
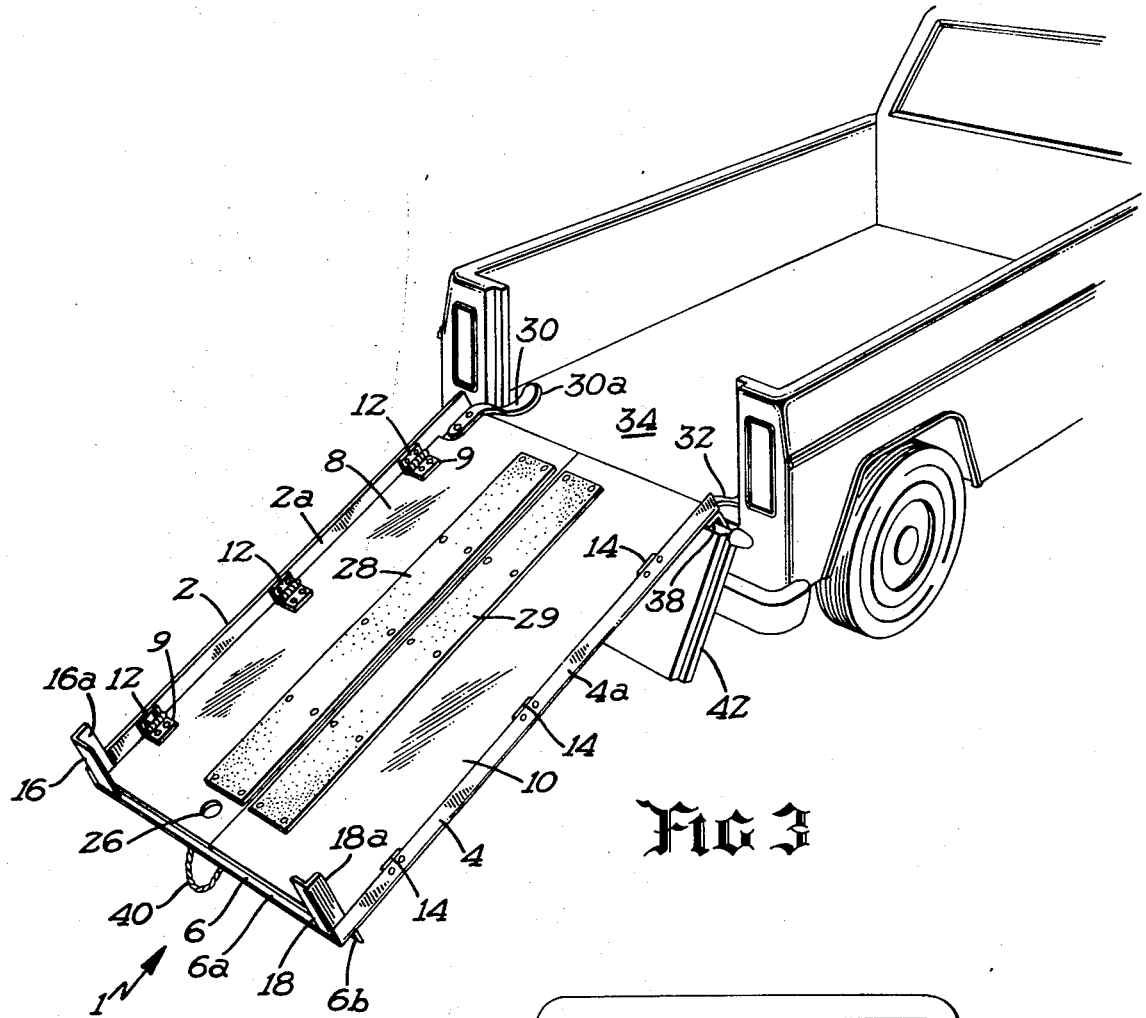
FIG. 3 is a side, perspective view showing the loading ramp in its inclined position of use in engagement with the rear end of a truck bed.

Referring now to the drawings, I have shown in FIG. 1 the basic frame and panel structure which makes up my loading ramp assembly. The frame assembly for the ramp is generally designated by reference numeral 1 and is comprised of a pair of elongated frame beams 2 and 4 which extend parallel to each other in laterally spaced relation, and define the side edges of the ramp structure. Connecting the rear ends of the side beams 2 and 4 together is a cross beam 6, which cooperates with frame beams 2 and 4 to form a generally U-shaped frame assembly which is open and unobstructed at its forward end between the front end extremities of beams 2 and 4, for a reason hereinafter explained. Beams 2, 4 and 6 can be made of various materials. I have found it convenient and structurally desirable to use elongated, angle iron members of generally right angle shape for this purpose. Thus, side beams 2 and 4 are comprised of a pair of right angle flanges 2a, 2b and 4a, 4b respectively, the bottom flange members being designated by reference numerals 2b and 4b. Cross beam 6 has an upper flange 6a which is attached by welding or other suitable means to flanges 2b and 4b of side beams 2 and 4. Downwardly depending, right angle flange 6b of cross beam 6 normally rests on the ground when the ramp is in its position of use as shown in FIG. 3.

Hingedly attached to side beams 2 and 4 are a pair of planar ramp panels 8 and 10. For this purpose, panels 8 and 10 are provided with hinge plates 9 and 11 respectively, attached to their lower edges, these plates being attached by hinge pins in a conventional manner to complementary hinge plates 12 and 14 attached to side beams 2 and 4. Ramp panels 8 and 10 are thus swingable along longitudinal axes defined by the hinge pins extending parallel to side frame beams 2 and 4. Panels 8 and 10 are swingable downwardly and inwardly towards each other from an upright position of non-use to a vehicle loading position wherein they lie in a common plane with side beams 2 and 4 to form a substantially continuous loading ramp as shown in FIG. 3.

Figure 4:
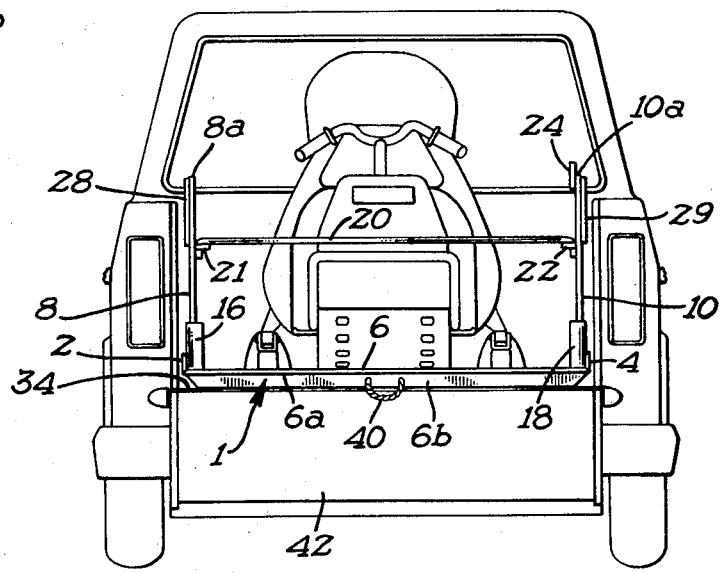
FIG. 4 is rear, elevation view of the loading ramp on a truck bed in its storage position.

When not being used to convey a cargo load onto or off of a truck or trailer bed, ramp panels 8 and 10 are swung upwardly and outwardly to the upright, storage position of non-use shown in FIG. 4. In order to hold panels 8 and 10 in this upright, storage position, I provide stop means in the form of a pair of rigid, upright corner posts 16 and 18 and a removable spreader bar 20. Corner posts 16 and 18 are preferably short lengths of angle iron which are welded to the upper flange face 6a of cross beam 6 at the rear corners of frame assembly 1 where the rear ends of side beams 2 and 4 attach to cross beam 6. When ramp panels 8 and 10 are swung to their upright storage positions, they are held against rear, swinging movement beyond this upright position by engagement of their rear, outside faces of ramp panels 8 and 10 are a pair of opposed rings or eyes 21 and 22 (see FIG. 4), which serve as attachment means for the downwardly depending ends of removable spreader bar 20. It will be appreciated that with spreader bar 20 attached between eyes 21 and 22 on ramp panels 8 and 10, the panels will be restrained against inward, swinging movement when in their upright storage position.

One of the ramp panels, for example, panel 10 as shown in FIGS. 1 and 4, has a support strip 24 fastened to its inner edge and projecting inwardly beyond the inner edge thereof as shown. When panels 8 and 10 are swung downwardly to their position of use, panel 10 is swung downwardly and inwardly first to a position where it is coplanar with side beams 2 and 4 and rest along its rear edge on cross beam 6. Panel 8 is then folded downwardly and inwardly with its inner, longitudinal edge 8a located right against inner edge 10a of panel 10 and resting on support strip 24 thereunder. For the purpose of raising panel 8 and swinging it rearwardly and outwardly to its upright storage position, I provide an aperture 26 through this panel at its rear end, which serves as a hand grip.

Attached to each of the panels 8 and 10 in a longitudinal direction along their inner edges are a pair of traction strips 28 and 29 which may be rubber pads. The purpose of traction strips 28 and 29 is to provide a traction surface for certain types of vehicle traveling up and down over the loading ramp onto and off of a truck or trailer bed. For example, the substantially central location of traction strips 28 and 29 on the ramp assembly permits them to serve effectively as traction surfaces for the endless belt of a snowmobile.

Attached to the front end of each of the side frame beams 2 and 4 are a pair of skid shoes 30 and 32. As is shown most clearly with respect to skid shoe 30 in FIG. 2, each of these skid shoes, which may be made of steel, plastic or other suitable material, is affixed at its inner end to the front end of one of the side beams 2 or 4 and depends forwardly and downwardly therefrom. Skid shoes 30 and 32 are of identical shape, and as is illustrated with respect to shoe 30 in FIG. 2, include an arcuate bottom, slide surface 30a disposed below side beams 2 and 4, and utilized for sliding contact with a truck bed designated by reference numeral 34 in FIG. 2. Also attached to the front end of side beams 2 and 4 are a pair of angle iron detent members 36 and 38 of substantially right angle shape, as is shown with respect to detent member 36 in FIG. 2. Detent members 36 and 38 depend downwardly from the underside of side beams 2 and 4, and are utilized to hold the ramp assembly in place against the rear end of a truck bed, as is hereinafter explained with respect to FIG. 2. At the rear end of frame assembly 1, attached to cross beam 6 is a handle, which may be a rope or plastic strap 40 utilized for pulling the entire ramp assembly out of a truck bed to position it for use.

The entire ramp assembly, is normally carried and stored on a truck bed with ramp panels 8 and 10 held in the upright position of non-use shown in FIG. 4. When it is desired to load or unload a cargo from a truck bed, the ramp assembly is pulled rearwardly out of the truck bed by gripping handle strap 40. The ramp assembly is pulled rearwardly to an inclined position as shown in FIG. 3 wherein its rear end, defined by cross beam 6, is resting on the ground, and its forward end rests on the rear end of truck 34. Spreader bar 20 is removed from connecting eyes 21 and 22 on ramp panels 8 and 10, and these panels are swung inwardly and downwardly to the position of use shown in FIG. 3 with panel 10 being swung downwardly first, and the inner edge 8a of panel 8 resting on support strip 24 of panel 10. In this position of use, panels 8 and 10 will lie in a common, inclined plane with bottom flanges 2b and 4b of side beams 2 and 4. The front ends of side beams 2 and 4 are supported on the rear end of truck bed 34, and the outer, longitudinal hinged edges of panels 8 and 10 are supported along bottom flanges 2b and 4b of side beams 2 and 4. Cross beam 6 serves as a base support for the rear edges of panels 8 and 10, when they are folded inwardly to their position of use. With the front end of the ramp assembly supported on the rear end of truck bed 34, and with cross beam 6 resting on the ground, the loading ramp will be supported in the inclined position of use shown in FIG. 3. In order to restrain the ramp assembly against shifting movement along its longitudinal axis when a load is being moved over the conveyor deck defined by panels 8 and 10, downwardly depending detent members 36 and 38 on the underside of side beams 2 and 4 are inserted within the space between the rear edge of truck bed 34 and the truck's downwardly swung tail gate 42, in the manner shown in FIG. 2. In the event that the truck or trailer with which the loading ramp is being used does not have a tail gate, a special bracket can be attached to the rear end of the truck bed, with the bracket having an elongated cross member which is supported outwardly from the rear end of the truck bed to define therewith a slot within which detent members 36 and 38 may be inserted.

With the loading ramp supported in the inclined position shown in FIG. 3, a cargo load, such as a snowmobile may be driven over ramp panels 8 and 10 onto truck bed 34. For such applications, traction or friction strips 28 and 29 are very helpful in assisting the vehicle to travel upwardly over the inclined ramp onto the truck bed. After the cargo has been transported over the loading ramp onto the truck bed, ramp panels 8 and 10 are swung upwardly and outwardly to their upright positions of non-use, with their rear, outer faces engaging corner posts 16 and 18. Spreader bar 20 is then attached between upright panels 8 and 10, utilizing eyes 21 and 22 for this purpose to hold ramp panels 8 and 10 in their upright storage positions as shown in FIG. 4. Downwardly depending detent members 36 and 38 are then disengaged from the slot between the rear end of truck bed 34 and tail gate 42 by lifting upwardly on cross beam 6. As this is done, the arcuate bottom surfaces of skid shoes 30 and 32 serve as cam surfaces by their engagement with truck bed 34 and their downwardly disposed position below side beams 2 and 4 to assist in elevating detent members 36 and 38 above the truck bed. With the rear end of the frame assembly defined by cross beam 6 raised upwardly, and with the entire ramp in a substantially horizontal position, the loading ramp is then pushed onto the truck bed, with skid shoes 30 and 32 serving as slide bearings. It will be appreciated that with no obstruction of any kind extending across the front end of the ramp assembly between the forward ends of side beams 2 and 4, these side beams will pass on either side of the cargo load, such as a snowmobile. In their upright storage positions, ramp panels 8 and 10 will straddle the load, along with side beams 2 and 4, with the result that the generally U-shaped ramp assembly may be quickly and easily shifted to a storage position on the truck bed in surrounding relation to the load without interfering with the cargo load being carried. When it is desired to remove the cargo from the truck bed, the aforesaid process is simply repeated by gripping handle strap 40 and again pulling the ramp assembly out of the truck bed to the inclined position of use shown in FIG. 3 and swinging panels 8 and 10 to their downwardly folded positions of use wherein they define a ramp transport surface.

I contemplate that various changes may be made in the size, shape and construction of my loading ramp without departing from the spirit and scope of my invention as defined by the following claims:

I claim:

1. A loading ramp for trucks and trailers comprising:
a frame assembly including a pair of laterally spaced apart, elongated, rigid frame beams extending parallel to each other and defining the side edges of a loading ramp, the forward end of said frame assembly between the front end extremities of said frame beams being open and unobstructed;
a pair of planar ramp panels, each of which is hingedly attached to one of said frame beams for swinging movement along longitudinal axes parallel to said frame beams, said panels being swingable downwardly and inwardly from an upright position of non-use to a loading position wherein they lie in a common plane with said frame beams to form a substantially continuous loading ramp; and
stop means for holding said panels in said upright position of non-use wherein said panels straddle a cargo load on a truck bed with said ramp resting on the truck bed and said frame beams extending along opposite sides of the truck bed.

2. A loading ramp as defined in claim 1 wherein:
said frame assembly is substantially U-shaped, being open at its forward end and having a cross beam tying said frame beams together at their rear ends, said cross beam serving as a base support for said panels when they are swung inwardly to said vehicle loading position.

3. A loading ramp as defined in claim 2 wherein:
each of said frame beams is of right angle shape and includes a bottom flange member which extends substantially horizontally when said frame assembly is lying flat and which serves to support the outer, longitudinal edges of said panels when they are swung inwardly to said loading position.

4. A loading ramp as defined in claim 2 wherein:
said stop means comprises a pair of rigid, upright corner posts located at the rear corners of said frame assembly where the rear ends of said frame beams attach to said cross beam, said corner posts bearing against the rear, outside faces of said ramp panels when said panels are swung to an upright position and serving to prevent the rear, swinging movement of said panels rearwardly beyond said upright position of non-use.

5. A loading ramp as defined in claim 4 wherein:
said stop means further comprises a spreader bar removably connected between said panels by attachment means on said panels, when said panels are in said upright position of non-use.

6. A loading ramp as defined in claim 1 wherein:
a downwardly depending detent member is attached to the underside of each of said frame beams at the front end thereof, said detent members being constructed and arranged to engage the rear edge of a truck bed to limit longitudinal shifting movement of said ramp when a load is being moved over it.

7. A loading ramp as defined in claim 1, and further including:
a skid shoe attached to the front end of each of said frame beams and depending forwardly and downardly therefrom, each of said skid shoes having an arcuate bottom, slide surface disposed below said frame beams for sliding contact with a truck bed.

8. In combination with a truck bed, a loading ramp comprising:
a generally U-shaped frame assembly comprising a pair of laterally spaced, elongated frame beams defining the opposite side edges of a ramp and connected at their rear ends by a cross beam, the front ends of said frame beams resting on the rear edge of said truck bed and said cross beam resting on the ground, whereby said frame assembly is supported in an inclined position for conveying loads to and from said truck bed;
a pair of ramp panels hingedly attached to said frame beams and swung downwardly and inwardly towards each other to a position of use in a common, inclined plane with said frame beams for supporting loads being conveyed to and from said truck bed, said panels being swingable upwardly and outwardly to a substantially upright position of non-use wherein they straddle the load on said truck bed when said ramp is shifted forwardly onto the truck bed with said frame beams on opposite sides of the load; and
stop means for holding said ramp panels in said upright position of non-use.

9. A loading ramp and truck bed combination as defined in claim 8, and further including:

a downwardly depending detent member on each of said frame beams at the front end thereof extending downwardly between the rear edge of said truck bed and a downwardly swung tail gate attached to the rear end of said truck bed, whereby said detent members prevent the longitudinal shifting movement of said ramp when a load is being moved on it.

10. A loading ramp and truck bed combination as defined in claim 8 wherein:

said stop means comprises a spreader bar removably connected between said panels by attachment means on said panels, when said panels are in said upright position of non-use.

* * * * *